United States Patent
Petersen et al.

(10) Patent No.: US 9,551,778 B2
(45) Date of Patent: Jan. 24, 2017

(54) GNSS JAMMER DETECTION SYSTEM WITH OPTICAL TRACKING AND IDENTIFICATION

(71) Applicant: NovAtel Inc., Calgary (CA)

(72) Inventors: Walter D. Petersen, Calgary (CA); John B. Schleppe, Calgary (CA)

(73) Assignee: NovAtel Inc., Calgary, Aberta ( * ) Notice: Subject to any disclaimer, the term of this patent is extended or adjusted under 35 U.S.C. 154(b) by 410 days.

(21) Appl. No.: 14/148,851

(22) Filed: Jan. 7, 2014

(65) Prior Publication Data
US 2015/0264239 A1    Sep. 17, 2015

(51) Int. Cl.
*H04N 5/232* (2006.01)
*G01S 3/786* (2006.01)
*G01S 19/21* (2010.01)

(52) U.S. Cl.
CPC .............. *G01S 3/786* (2013.01); *G01S 19/21* (2013.01)

(58) Field of Classification Search
CPC .......... H04N 5/232; G01S 19/21; G01S 3/786; G06T 2207/10016; G06T 7/004; G06T 7/2093
USPC ...................................................... 348/169
See application file for complete search history.

(56) References Cited

U.S. PATENT DOCUMENTS

| | | | | |
|---|---|---|---|---|
| 2006/0034489 A1* | 2/2006 | McClanahan | ........... | G01S 11/12 382/107 |
| 2008/0042810 A1* | 2/2008 | Nakane | ............... | B60R 25/1012 340/426.18 |
| 2009/0060276 A1* | 3/2009 | Yu | ....................... | G06K 9/00771 382/103 |
| 2011/0001657 A1* | 1/2011 | Fox | ........................ | G01S 7/2922 342/107 |
| 2011/0148712 A1* | 6/2011 | DeCabooter | ........ | B60R 25/1025 342/457 |
| 2012/0032854 A1* | 2/2012 | Bull | ...................... | G01S 5/0215 342/450 |
| 2014/0111368 A1* | 4/2014 | Lee | ......................... | B63B 49/00 342/41 |

OTHER PUBLICATIONS

Gromov, K., Dissertation—"GIDL: Generalized Interference Detection and Localization System", Mar. 2002, 266 pages.

(Continued)

*Primary Examiner* — Christopher S Kelley
*Assistant Examiner* — Zhihan Zhou
(74) *Attorney, Agent, or Firm* — Cesari and McKenna, LLP (57) ABSTRACT

A system detects, identifies, and optically tracks a jammer by calculating position and velocity information associated with the jammer based on jamming signals received at one or more antennas, and utilizing the position and velocity information to control one or more cameras. The cameras capture a series of images that include the calculated location, the expected movement of the jammer, or both. The system analyzes the images to extract motion information associated with one or more objects identified in the images. The system utilizes the calculated position and velocity information and the extracted motion information to determine which of the identified object in the images is the jammer. Further, the jammer motion information extracted from the images may be utilized to update the calculated position and velocity information associated with the jammer, to improve the overall accuracy of the tracking of the jammer.

20 Claims, 5 Drawing Sheets

(56) References Cited

OTHER PUBLICATIONS

Gromov, K. et al., "GIDL: Generalized Interference Detection and Localization System", ION GPS 2000, Sep. 19-22, 2000, Salt Lake City, UT, pp. 447-457.
Gromov, K. Dissertation—"GIDL: Generated Interference Detection and Localization System", Mar. 2002, pp. ii-43.
Lindstrom, J., et al.. "GNSS Interference Detection and Localization using a Network of Low Cost Front-End Modules", ION GNSS $20^{th}$ International Technical Meeting of the Satellite Division, Sep. 25-28, 2007, Fort Worth, TX, pp. 1165-1172.
Pauwels, K., et al., "Realtime Phase-based Optical Flow on the GPU", 2008 IEEE.

\* cited by examiner

GNSS JAMMER DETECTION SYSTEM WITH OPTICAL TRACKING AND IDENTIFICATION

BACKGROUND OF THE INVENTION

Field of the Invention

The invention relates generally to GNSS systems, and in particular, to GNSS systems that perform jammer detection.

Background Information

Global navigation satellite systems (GNSS) provide ranging signals that are utilized in applications that determine global positions for surveys, global positions for delivery trucks, global positions for aircraft at and/or approaching airports, and so forth. As is well known, GNSS antennas receive signals from a plurality of GNSS satellites and associated GNSS receivers determine positions based on the timing of codes and carriers in the received GNSS satellite signals.

Increasingly, jamming devices are utilized to transmit jamming signals to intentionally disrupt position calculation operations performed by particular GNSS receivers. A portable jammer may be used, for example, on a delivery truck, to transmit jamming signals to the GNSS antenna located on the truck, in order to occasionally disrupt operations that track the movement of the truck. The jamming signals may also unintentionally disrupt the operations of other GNSS receivers in the same area. For example, the truck may be on a highway traveling by an airport and may disrupt the operation of GNSS receivers at and/or near the airport that are utilized to determine global positions of the aircraft.

The jamming signals have the same or near the same frequencies as the GNSS satellite signals. Further, the received jamming signals have a much higher power than the received GNSS satellite signals because the distance between the jamming device and the GNSS antenna is much shorter than the distance between the GNSS satellites and the GNSS antenna. Thus, the jamming signals overwhelm the GNSS satellite signals at the GNSS receivers, such that the GNSS receivers may not be able to track the codes in the received GNSS satellite signals.

Currently, GNSS jammer detectors determine position and velocity information associated with a jammer based on the detected direction of the received jamming signals, typically with an accuracy of approximately 5 m at a 200 m distance. While the jammer detector systems provides useful information as to the general location of and/or route traveled by the jammer, it does not provide sufficient information to readily identify the jammer.

SUMMARY OF THE INVENTION

The inventive system and method detects and also optically identifies and tracks a jammer that is producing one or more jamming signals. Specifically, the system calculates position and velocity information associated with a jammer based on the jamming signals received at one or more antennas. The system then utilizes the position and velocity information to control one or more cameras to optically identify and track the jammer. For example, the system may steer the cameras, or power on all or particular cameras, such that the fields of vision of the cameras include the calculated location of the jammer and the expected movement of the jammer based on the calculated position and velocity information.

The cameras capture a series of images that includes the calculated location and track the expected movement of the jammer. The system next analyzes the images, for example, utilizing an optical flow algorithm, to extract motion information associated with one or more objects identified in the images. The system then utilizes the calculated position and velocity information based on the received jamming signals and the extracted motion information based on the images to determine which of the identified objects in the images is the jammer.

Thereafter, the cameras continue to track the jammer based on updated calculated position and velocity information as well as the motion information derived from the images. Further, the system may operate the cameras, by zooming in and so forth, to obtain other visual information (e.g., license plate number, vehicle type, etc.) from the captured images. While the jammer is tracked, confidence in positive identification increases. The jammer is positively identified when an associated calculated confidence value exceeds a defined threshold. The system may then provide the information to the appropriate authorities.

In a further embodiment, the motion information extracted from the camera images may be utilized to update the calculated position and velocity information associated with the jammer, to improve the overall accuracy of the tracking of the movement of the jammer.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1A:
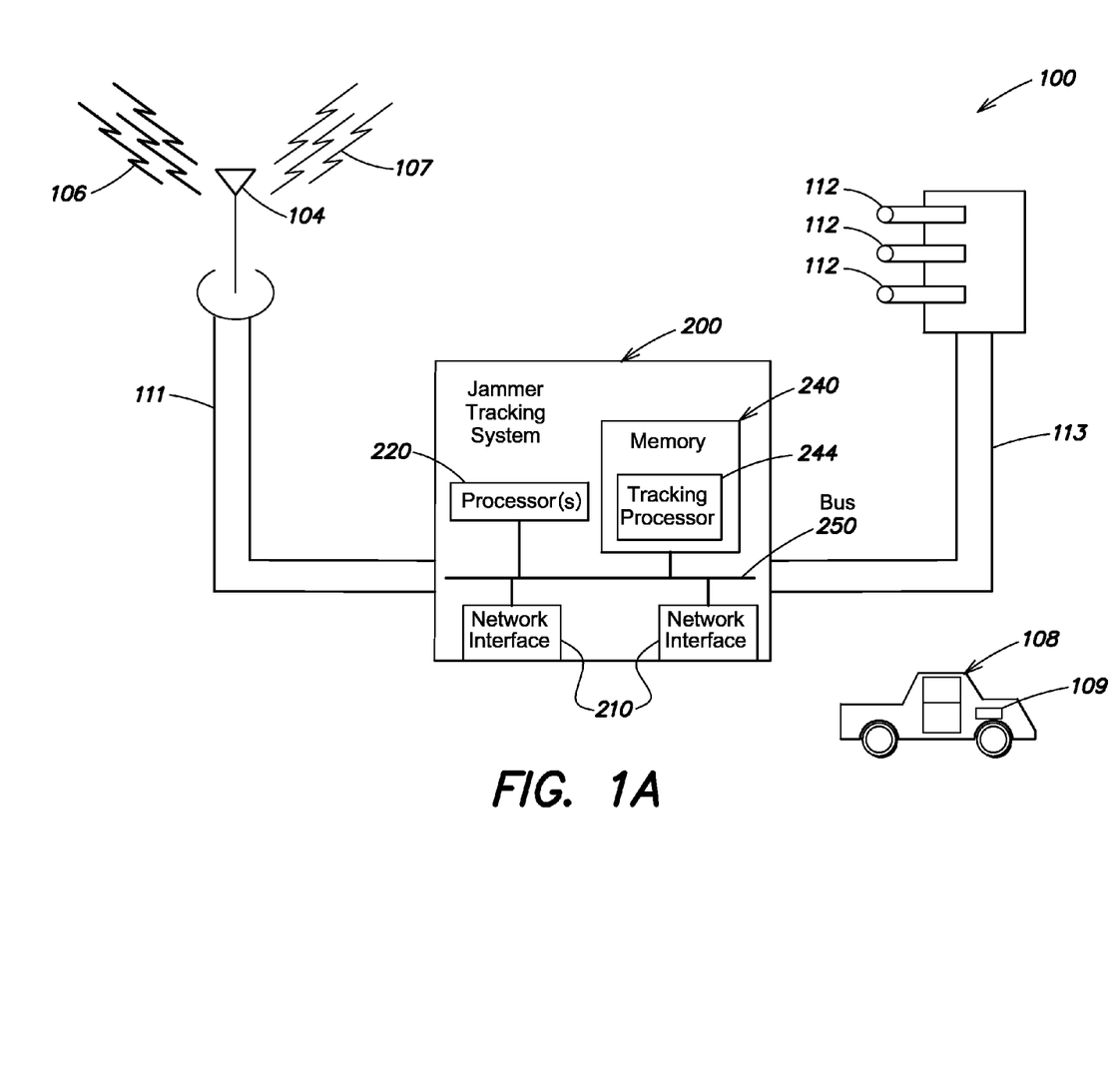
FIGS. 1A and 1B illustrate systems constructed in accordance with the invention.

Referring to FIG. 1A, a system 100 includes one or more antennas 104 that receive GNSS satellite signals 107, and also receive one or more jamming signals 106 that are transmitted by a local jammer 108. The jammer 108, may be, for example, a vehicle that carries a jamming device 109. As the vehicle travels sufficiently close to the antennas 104, jamming signals 106 transmitted by the on-board jamming device 109 reach the antennas 104. The received jamming signals 106, which have higher power than the received GNSS satellite signals 107, interfere with the processing of the GNSS satellite signals 107.

System 100 further includes a jammer tracking system 200 that detects jamming signals transmitted by the jamming device 109 and calculates position and velocity information associated with the jammer 108. The jammer tracking system 200 utilizes the calculated position and velocity to control cameras 112, in order to capture images that include the location of the jammer 108 and expected movement of the jammer based on the calculated position and velocity information. The jammer tracking system 200 extracts motion information for objects identified in the captured images, and utilizes the motion information with the calculated position and velocity information to determine which of the objects in the images is the jammer 108. The operations of the jammer tracking system 200 are discussed in more detail below.

The jammer tracking system 200 includes a plurality of network interfaces 210, one or more processors 220, and a memory 240 interconnected by a system bus 250. The network interfaces 210 contain the mechanical, electrical, and signaling circuitry for communicating data over links of a computer network. The network interfaces may be configured to transmit and/or receive data using a variety of different communication protocols, as known by those skilled in the art.

It is noted that the antennas 104 may be physically coupled to the jammer tracking system 200, utilizing a link 111 as shown in FIG. 1, so that the jammer tracking system 200 can process and analyze the signals received at the antennas 104. In an alternative embodiment, the network interfaces 210 may be utilized such that the jammer tracking system 200 can communicate with the antennas 104, over, for example, a wireless network.

The memory 240 comprises a plurality of locations that are addressable by the processor(s) 220 and the network interfaces 210 for storing software programs and data structures associated with the embodiments described herein. The processor 220 may comprise necessary elements or logic adapted to execute the software programs and manipulate the data structures. A tracking processor 244, which is one of the processor(s) 220, facilitates identifying and tracking the jammer 108. It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

More specifically, the tracking processor 244 detects the jamming signals 106 and calculates position and velocity information associated with the jammer 108 that is transmitting the jamming signals 106. For example, and as known by those skilled in the art, the power of the received jamming signals 106 is much higher than the power of the received GNSS satellite signals. As such, the tracking processor 244 distinguishes the received jamming signals 106 from the GNSS satellite signals based on the power levels associated with the respective signals.

Once a jamming signal is detected, the tracking processor 244 operates in a known manner to calculate position and velocity information associated with the jammer 108 that is transmitting the jamming signals 106. If, for example, at least two antennas 104 receive the jamming signals 106, the tracking processor 244 operates in a known manner to determine a 2-dimensional or 3-dimensional location (e.g., x-coordinate and y-coordinate and possibly z-coordinate) and the velocity of the jammer 108 based on the differences in the relative power of the signals at the respective antennas. See, for example, *GNSS Interference Detection and Localization using a Network of Low Cost Front-End Modules*, by Jonas Lindstrom et al., 2007. The tracking processor 244 may determine the 2-dimensional position or 3-dimensional position (with at least 3 antennas) of the jammer 108, within an accuracy of 5 m at a 200 m distance, for example. If only one antenna receives the jamming signals 106, the tracking processor 244, operating in a known manner, may determine a relative direction and the velocity of the jammer 108 based on changes in the signal power at the antennas as the jammer moves relative to the antennas.

The tracking processor 244 utilizes the position and velocity information to control at least one function of the one or more cameras 112, which may be coupled to the tracking processor 244 over a communication link 113. The cameras 112 may be any type of camera configured to capture a series of images (e.g., frames at a particular frame rate), such as a digital still camera or a digital video camera. Such functions may include, but are not limited to, steering the cameras 112 in one or more particular directions, powering on and powering off all or particular cameras 112, commanding all or particular cameras 112 to capture images at particular times, and having the cameras 112 zoom in or zoom out.

For example, if the position information indicates that the jammer 108 is at a particular location, corresponding to an x-coordinate and a y-coordinate and, as appropriate, a z-coordinate of, the tracking processor 244 may cause the cameras 112 to be steered so that the fields of vision of the respective cameras 112 include the calculated location. Alternatively, the tracking processor 244 may cause the cameras 112 that are pointing in the appropriate direction, that is, whose fields of vision include the calculated location, to power on. In either instance, and when at least one of the cameras 112 has the location of interest in view, the cameras 112 are operated to capture a series of images that track the expected movement of the jammer.

Once the series of images are captured, the tracking processor 244 processes and analyzes the images using a suitable optical algorithm, in a known manner, to extract motion information associated with one or more objects identified in the series of captured images. A suitable algorithm may be, for example, an algorithm that is based on optical flow, for which there exists many know variants. In the example, the system may use an optical flow algorithm that is described in Pauwels, K.; Van Hulle, M. M., "Real-time phase-based optical flow on the GPU," *Computer Vision and Pattern Recognition Workshops,* 2008. CVPRW '08. IEEE Computer Society Conference, 23-28 Jun. 2008, pp. 1-8, Anchorage, Ak. Further, the tracking processor 244 "tags" objects in the series of captured images, in order to locate the same objects in images taken at different times, and determines the movement or motion of each identified object.

The tracking processor 244 then utilizes the position and velocity information calculated based on the received jamming signals and the motion information extracted from the images, and determines to some level of confidence which object identified in the captured images is the jammer 108. Specifically, the tracker processor 244 uses the extracted motion information associated with each object identified in the captured images, to determine which particular identified object is essentially moving at a velocity that corresponds to the velocity calculated for the jammer based on the received jamming signals.

If two or more of the objects are moving at or near the jammer's calculated velocity and are thus suspected to be the jammer, the tracker processor 244 may continue to track the objects using the images for an extended period of time, to determine which particular object continues to move in a way that corresponds to the calculated position and velocity determined from the received jamming signals. The system then identifies the particular object as the probable jammer.

If none of the objects are moving at or near the jammer's calculated velocity, the tracker processor 244 may capture new images that correspond to updated position and velocity information, determine the movement of newly identified objects in the newly captured images, and then determine which of the newly identified objects has a velocity that corresponds to the updated velocity of the jammer, and so forth.

It is noted that the confidence that the particular object identified in the images as the jammer is the actual jammer increases the longer the particular object is visually tracked and moves in accordance with the calculated position and velocity. Thus, the particular object initially determined to be the jammer may be tracked for an additional amount of time before the system specifies that the particular object in the images is the jammer 108. This would occur when confidence metrics exceed a predetermined threshold.

The confidence metrics may be, for example, based on a tracking filter (e.g., a Kalman filter) that utilizes as inputs the estimated trajectory of the jammer with an associated estimated error variance based on the calculated position and calculated velocity, and the estimated trajectory of the jammer with an associated estimated error or variance based on the motion information from the images. The tracking filter, operating in a known manner, predicts the movement of the jammer and provides corresponding covariance matrices. Based on the covariance matrices, the system, in a known manner, produces an associated error ellipsoid that may be calculated in either 2 or 3 dimensions, as appropriate. As the jammer is visually tracked, the system more accurately estimates the trajectories and thus the overall size of the calculated error ellipsoid correspondingly shrinks. A statistical detection confidence level is associated with the size of the error ellipsoid, and a threshold level is set to an appropriate confidence level (e.g., above 90%). Thus, when the size of the error ellipsoid reduces to reach or exceed the corresponding threshold, the system determines that the particular object identified as the jammer in the images is the actual jammer 108.

Advantageously, the tracker processor 244 can then continue to visually track the identified jammer 108 utilizing the cameras 112 to acquire more information about the jammer. For example, an array of cameras may work in conjunction with each other to visually "follow" (e.g., track) the jammer utilizing the calculated position and velocity information and the extracted motion information. Specifically, as the jammer 108 moves through the field of vision of each camera of the array, the appropriate cameras may be operated (e.g., steered or powered on) to continue to capture images of the jammer 108 as it travels. Further, the cameras 112 may utilize a motorized zoom feature, for example, to focus in on a license plate, or other characteristics associated with the jammer 108. This other visual information may then be utilized by, for example, law enforcement agencies to locate and apprehend the jammer 108.

The visual tracking of the jammer provides velocity and, as appropriate, position information at a faster rate than the system calculates the position and velocity based on the received jamming signals. Accordingly, the extracted motion information associated with the identified jammer may also be utilized by the tracker processor 244 to update the calculated position and velocity information, and thus, to improve the overall accuracy of the tracking of the jammer's movement. Specifically, it is noted that initial position information calculated based on the jamming signal may be accurate to within, for example, 5 m at 200 m distance. As such, it may be advantageous to more precisely determine the position and velocity of the jammer 108 in order to more accurately identify and track the movement of the jammer 108. Thus, the tracker process 244 utilizes the jammer motion information extracted from the images to update at least the calculated velocity information associated with the jammer 108. The calculated position information may also be updated based, in part, on the known positions and characteristic of the cameras.

Figure 1B:
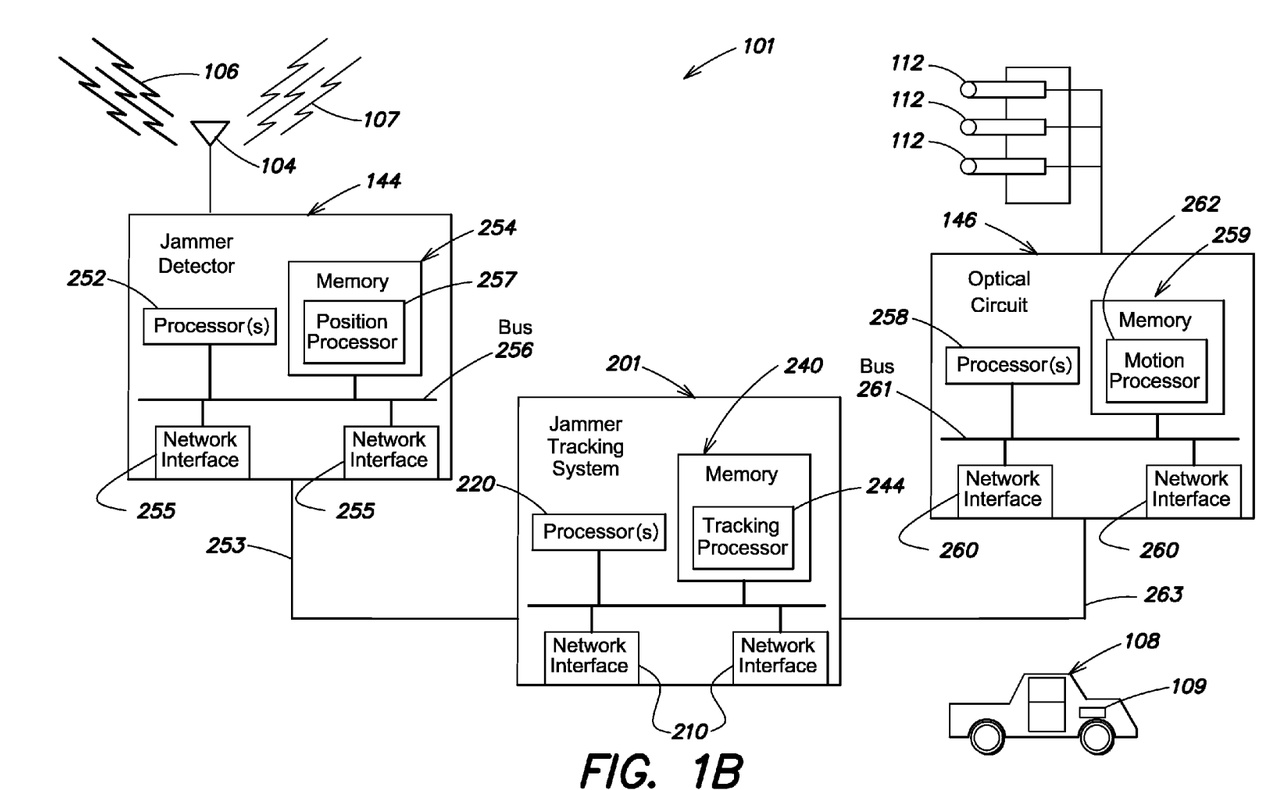

FIG. 1B depicts an alternative embodiment, where a system 101 includes a jammer detector 144 and an optical circuit 146 that are separate hardware devices coupled to the jammer tracking system 201. The jammer detector 144 is coupled to the antennas 104 and includes one or more processor(s) 252, a memory 254, and network interfaces 255 interconnected by a system bus 256. For example, the jammer detector 144 may be a radio frequency front end module. A position processor 257, of the processor(s) 252, operating in a known manner calculates the position and velocity of the jammer 108 based on the power levels of the detected jamming signals 106 at the respective antennas 104. The jammer detector 144 then transmits the calculated position and velocity information to the tracking processor 244, which is part of the jammer tracking system 201 over a communication path 253 (e.g., wireless) of the network.

The jammer tracking system 201 transmits the calculated position and velocity information to the optical circuit 146 over a communication path 263 of the computer network. Alternatively, the jammer detector 144 may transmit the calculated position and velocity information directly to the optical circuit 146, over the network.

The optical circuit 146, coupled to the cameras 112, includes one or more processor(s) 258, a memory 259, and network interfaces 260 interconnected by a system bus 261. The optical circuit 146 utilizes the received position and velocity information to control the cameras 112, such that the cameras 112 capture a series images that include the jammer's calculated location and expected movement, or both. A motion processor 262 of the processor(s) 258 extracts motion information associated with objects identified in the series of captured images. For example, the motion processor 262 may execute an optical flow algorithm to identify objects in the series of images and extract associated motion information. The optical circuit 146 then transmits the extracted motion information to the tracking processor 244 of the jammer tracking system 200 over the communication path 263 of the network.

The tracking processor 244 utilizes the calculated position and velocity information and the extracted motion information to determine which particular object identified in the series of captured images is the jammer 108, in a similar manner as described above with reference to FIG. 1A.

Figure 2A:
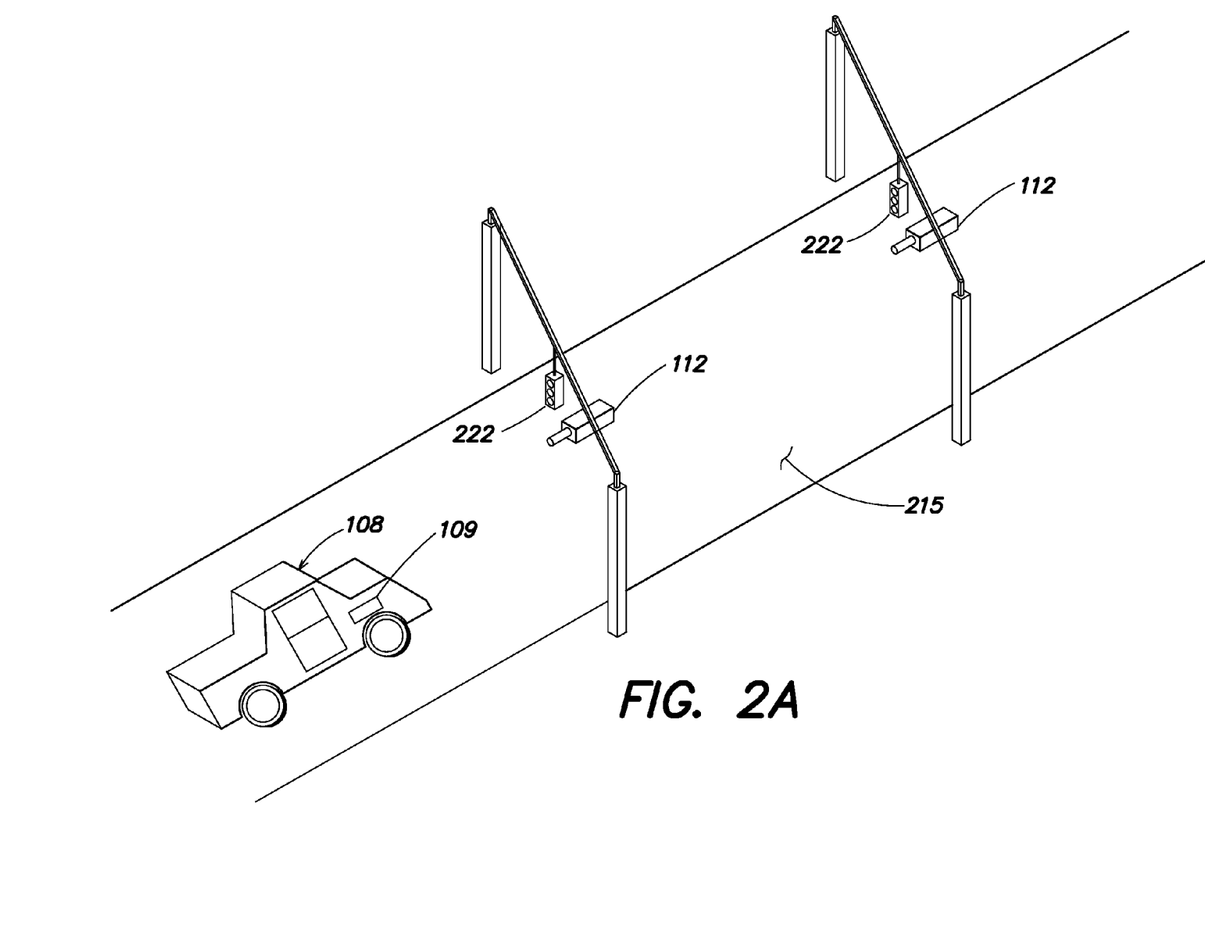
FIGS. 2A and 2B illustrate environments in which the system of FIGS. 1A and 1B may operate.

FIG. 2A shows an environment in which the system of FIGS. 1A and 1B may operate. Specifically, the cameras 112 are located along a road 215. For example, the cameras 112 may be secured to one or more traffic lights 222, partitions, or any other local structures. The jammer 108, carrying a jamming device 109, is traveling on the road 215.

The system calculates the position and velocity based on the received jamming signals. The system then utilizes the calculated position and velocity of the jammer 108 to control the sequential powering on of particular cameras 112 such that the fields of vision of the cameras include the calculated location and expected movement of the jammer 108. The cameras thus capture a series of images that essentially follow the jammer. If the cameras 112 continuously operate, the system uses the calculated position and velocity information to instead determine which images from the respective cameras should be analyzed to identify and track the jammer.

Figure 2B:
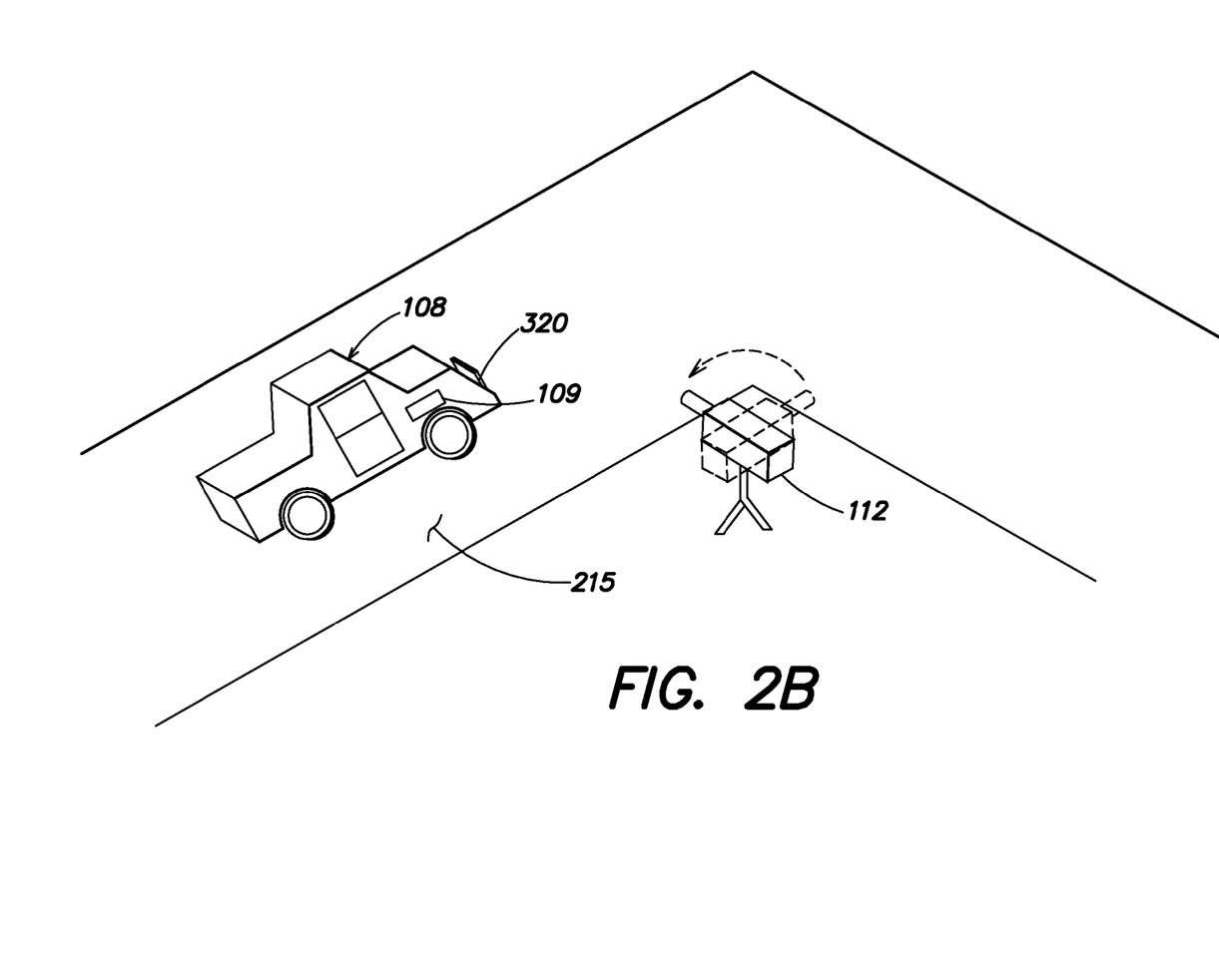

Alternatively, and as depicted in FIG. 2B, a given camera 112 may be steered in a particular direction corresponding to the calculated position and velocity information so that the field of vision of the camera 112 includes the calculated location and the expected movement of the jammer 108. In the example, and as indicated by the dotted arrow in FIG. 2B, the camera 112 is steered to the left at a particular time, such that the field of vision of the camera 112 includes the calculated location and expected movement of the jammer 108.

The system then analyzes the series of captured images to determine which particular object identified in the images is the jammer 108, as described above with reference to FIGS. 1A and 1B.

The system continues to control the cameras 112, as depicted in FIGS. 2A and 2B, in order to visually track the jammer 108 as the jammer 108 travels on the road 215, based on the calculated position and velocity information and the extracted motion information of the jammer 108. Further, other information may be obtained from the series of captured images, such as the visual characteristics of the jammer, i.e., make and color of the vehicle, the numbers and letters on a license plate 320. This information can then be provided to law enforcement agencies. For example, the cameras 112 may utilize a zoom feature to obtain a clear image of the license plate 320 on the jammer 108 and/or people in the vehicle.

Figure 3:
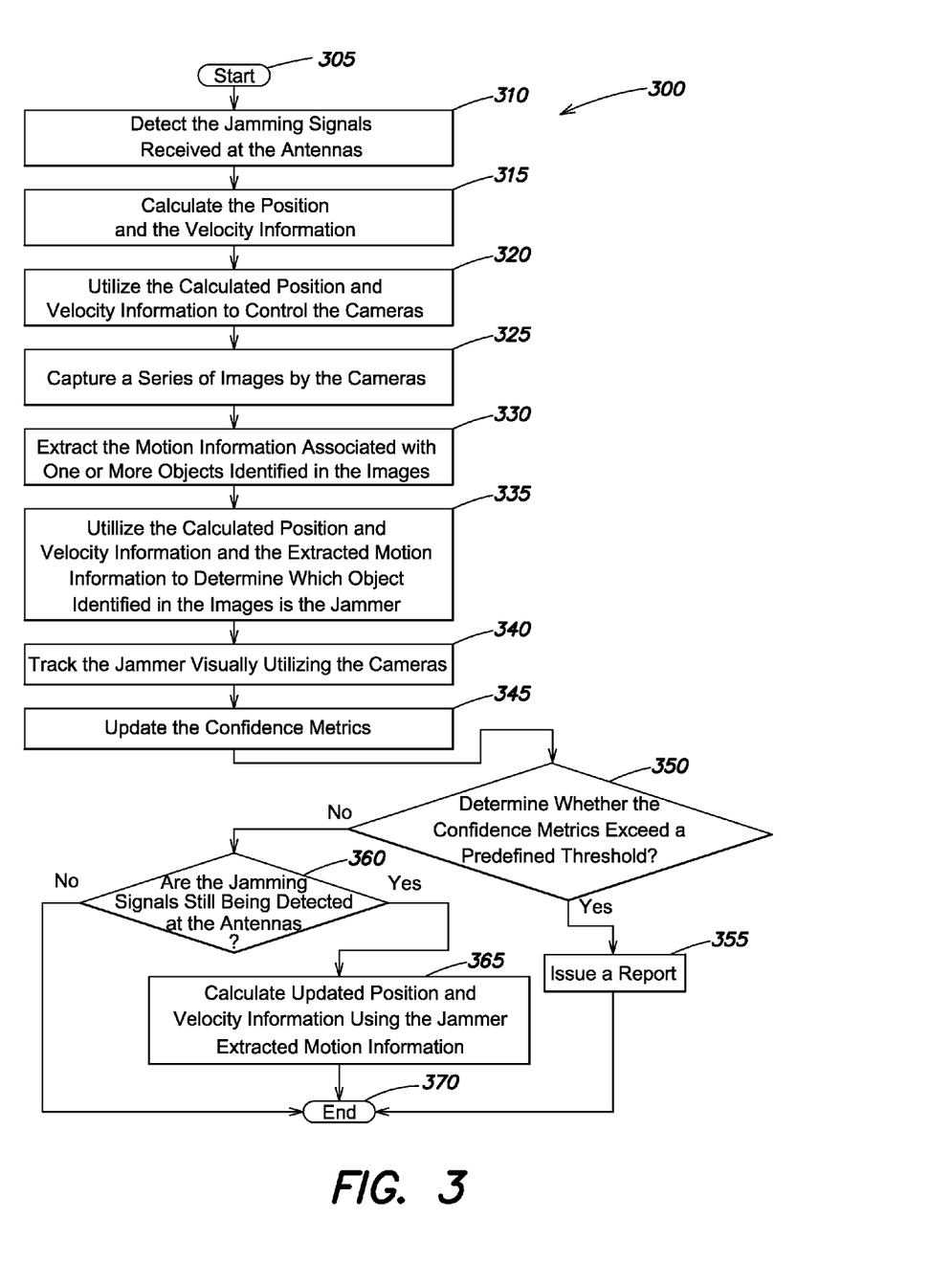
FIG. 3 is a flow chart for the operation of the systems of FIGS. 1A and 1B.

FIG. 3 is a flow chart of the operations of the system for detecting, and also optically identifying and tracking a jammer. The procedure 300 starts at step 305 and continues to step 310, where the system detects jamming signals received at one or more antennas. For example, the system may detect/distinguish the jamming signals from GNSS satellite signals at the antennas utilizing power associated with the respective signals. At step 315, the system, operating in a known manner, calculates position and velocity information, based on the detected jamming signals. Specifically, a 2-dimensional location and velocity of the jammer may be calculated utilizing one of a known variety of different algorithms, wherein the 2-dimensional location is within a particular accuracy. At step 320, the system utilizes the calculated position and velocity information to control one or more cameras. For example, the system may steer the cameras such that the fields of vision of the cameras include the calculated location and expected movement of the jammer. Alternatively, the system may use the position and velocity information to control the powering on of particular cameras whose fields of vision include the calculated location and expected movement of the jammer.

At step 325, a series of images are captured by the cameras, where each image includes the calculated location and/or expected movement of the jammer. At step 330, motion information associated with one or more objects identified in the captured images is extracted utilizing, for example, an optical flow algorithm. The one or more identified objects may be tagged in the captured images to locate the same object in images taken at different times.

At step 335, the calculated position and velocity information and the motion information extracted from the images are utilized to determine which object identified in the series of captured images is the jammer. For example, the system determines which object identified in the images has a velocity that corresponds to the velocity calculated for the jammer from the received jamming signals. At step 340, the identified jammer is tracked visually utilizing the cameras. For example, the object identified as the jammer may be visually tracked traveling along a road, utilizing images from one or more cameras stationed on the road, based on the calculated position and velocity information and the extracted motion information. Further, other visual information, such as a license plate number, or other pertinent information associated with the jammer, may be obtained from the images.

At step 345, confidence metrics are updated. At step 350, the system determines whether the confidence metrics exceed a predefined threshold. If the confidence metrics exceed the predefined threshold, the jammer is positively identified and the procedure branches to step 355. At step 355, a report is issued. The report may, for example, include visual evidence associated with the jammer, position information associated with the jammer, velocity information associated with the jammer, movement associated with the jammer, and so forth. The procedure then branches to step to step 370. At step 370, the procedure ends.

If at step 350 it is determined that the confidence metrics do not exceed the predefined threshold and the jammer is thus not yet positively identified, the procedure branches to step 360, where the system determines whether the jamming signals are still being detected at the antennas. If, at step 360, it is determined that the jamming signals are still being detected at the antennas, the procedure branches to step 365 and the jammer motion information that is extracted from the images is utilized to calculate updated position and velocity information associated with the jammer. If, at step 360, it is determined that the jamming signals are not being detected at the antennas, the procedure branches to step 370. At step 370, the procedure ends.

The foregoing description described certain example embodiments. It will be apparent, however, that other variations and modifications may be made to the described embodiments, with the attainment of some or all of their advantages. For example, although reference is made to a single jammer, it is expressly contemplated that the jammer tracking processor may identify different jammers based on detected relative movements of the different jamming signals, and visually identify and track the different jammers utilizing the techniques described above. Notably, the movement of one or more jammers may include periods in which the jammers are stationary. Further, although reference is made to utilizing power levels to detect and distinguish the jamming signals, it is expressly contemplated that a variety of other techniques, as known by those skilled in the art, may be utilized to detect and distinguish the jamming signals at the antennas. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. An apparatus, comprising:
   one or more network interfaces adapted to communicate data over a computer network;
   a processor coupled to the network interfaces and adapted to execute one or more processes; and
   a memory configured to store a process executable by the processor, the process when executed operable to:
   determine position information and velocity information associated with a jammer carrying a jamming device that is transmitting one or more jamming signals that interfere with Global Navigation Satellite System (GNSS) signals,
   utilize the position information and velocity information to control one or more cameras so that the one or more cameras capture images that include a location of the jammer, expected movement of the jammer, or both, extract motion information associated with a plurality of objects identified in the images, and determine which particular object of the plurality of objects identified in the images is the jammer utilizing the position information and the velocity information and the extracted motion information.

2. The apparatus of claim 1, wherein the process when executed is further operable to:

utilize the extracted motion information to determine updated position information and updated velocity information associated with the jammer.

3. The apparatus of claim 1, wherein the process when executed is further operable to:

utilize the extracted motion information for the jammer and the position information and velocity information to control the one or more cameras to continue to visually track the jammer for a threshold amount of time or until confidence metrics have exceeded a set threshold.

4. The apparatus of claim 1, wherein an optical algorithm capable of detecting motion is utilized to the extract motion information associated with one or more objects identified in the images.

5. The apparatus of claim 1, wherein the location of the jammer includes a relative direction of the jammer.

6. The apparatus of claim 1, wherein the location of the jammer is in 2 dimensions or three dimensions.

7. The apparatus of claim 1, wherein the process when executed is further operable to:

steer the one or more cameras in one or more directions so that their fields of vision include the location of the jammer, the expected movement of the jammer, or both.

8. The apparatus of claim 1, wherein the process when executed is further operable to:

power on the one or more cameras whose fields of vision include the location of the jammer and the expected movement of the jammer.

9. The apparatus of claim 1, wherein the jammer is a motor vehicle carrying the jamming device.

10. The apparatus of claim 1, wherein the process when executed is further operable to:

distinguish the one or more jamming signals from the GNSS signals utilizing relative power levels of received jamming signals and received GNSS signals.

11. A method, comprising:

determining position information and velocity information associated with a jammer carrying a jamming device that is transmitting one or more jamming signals that interfere with Global Navigation Satellite System (GNSS) signals;

utilizing the position information and velocity information to control one or more cameras so that the one or more cameras capture images that include a location of the jammer, expected movement of the jammer, or both;

extracting motion information associated with a plurality of objects identified in the images; and determining, by a processor, utilizing the position information and the velocity information and the extracted motion information, which particular object of the plurality of objects identified in the images is the jammer.

12. The method of claim 11, further comprising:
utilizing the extracted motion information for the jammer to determine updated position information and updated velocity information associated with the jammer.

13. The method of claim 11, further comprising:
utilizing the extracted motion information for the jammer and the position information and velocity information to control the one or more cameras to continue to visually track the jammer for a threshold amount of time.

14. The method of claim 11, wherein an optical algorithm capable of detecting motion is utilized to extract the motion information associated with one or more objects identified in the images.

15. The method of claim 11, wherein the location of the jammer includes a relative direction of the jammer.

16. The method of claim 11, wherein the location of the jammer is in 2 dimensions or 3 dimensions.

17. The method of claim 11, wherein to control the one or more cameras further comprises:

steering the one or more cameras in one or more directions so that their field of vision includes the location of the jammer, the expected movement of the jammer, or both.

18. The method of claim 11, wherein to control the one or more cameras further comprises:

powering on the one or more cameras whose field of vision includes the location of the jammer, the expected movement of the jammer, or both.

19. The method of claim 11, further comprising:
distinguishing the one or more jamming signals from the GNSS signals utilizing relative power levels of received jamming signals and received GNSS signals.

20. A tangible, non-transitory, computer-readable media having software encoded thereon, the software when executed by a processor operable to:

determine position information and velocity information associated with a jammer carrying a jamming device transmitting one or more jamming signals that interfere with Global Navigation Satellite System (GNSS) signals;

utilize the position information and velocity information to control one or more cameras so that the one or more cameras capture images that include a location of the jammer, expected movement of the jammer, or both;

extract motion information associated with a plurality of objects identified in the images; and utilizing the position information and the velocity information and the extracted motion information to determine which particular object of the plurality of objects identified in the images is the jammer.

* * * * *